United States Patent
Tsuda

(10) Patent No.: US 12,391,150 B2
(45) Date of Patent: Aug. 19, 2025

(54) CONTROL DEVICE AND CONTROL METHOD

(71) Applicant: TOYOTA JIDOSHA KABUSHIKI KAISHA, Toyota (JP)

(72) Inventor: Satoshi Tsuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 18/457,680

(22) Filed: Aug. 29, 2023

(65) Prior Publication Data

US 2024/0140273 A1  May 2, 2024

(30) Foreign Application Priority Data

Oct. 27, 2022  (JP) ................................ 2022-172401

(51) Int. Cl.
*B60N 2/00* (2006.01)
*B60R 16/037* (2006.01)

(52) U.S. Cl.
CPC .......... *B60N 2/0025* (2023.08); *B60R 16/037* (2013.01); *B60N 2/0035* (2023.08); *B60Y 2300/43* (2013.01); *B60Y 2306/09* (2013.01)

(58) Field of Classification Search
CPC .. B60N 2/0025; B60N 2/0035; B60R 16/037; B60Y 2300/43; B60Y 2306/09
See application file for complete search history.

(56) References Cited

U.S. PATENT DOCUMENTS

| | | | |
|---|---|---|---|
| 9,835,062 B2 * | 12/2017 | Jung | F01N 1/065 |
| 2018/0056978 A1 | 3/2018 | Hata et al. | |
| 2018/0194356 A1 | 7/2018 | Richards et al. | |
| 2019/0116421 A1 * | 4/2019 | Kano | H04R 3/04 |
| 2024/0393152 A1 * | 11/2024 | Aizawa | G06F 3/165 |

FOREIGN PATENT DOCUMENTS

| | | | | |
|---|---|---|---|---|
| JP | 2006-224687 A | | 8/2006 | |
| JP | 2007-331737 A | | 12/2007 | |
| JP | 2018-19515 A | | 2/2018 | |
| JP | 2018-030510 A | | 3/2018 | |
| JP | 2019034736 A | * | 3/2019 | ............. B60N 2/002 |

OTHER PUBLICATIONS

English translation of Endo et al. (JP 2019034736) (Year: 2019).*

* cited by examiner

*Primary Examiner* — Abby J Flynn
*Assistant Examiner* — Kyle J Kingsland
(74) *Attorney, Agent, or Firm* — Oblon, McClelland, Maier & Neustadt, L.L.P.

(57) ABSTRACT

A control device includes an acquisition unit configured to acquire a position at which one or more occupants of a vehicle are seated, and a controller configured to determine necessity of reduction of noise of a drive source of the vehicle based on a distance between the position and the drive source of the vehicle, and reduce the noise by controlling the drive source according to a determination result of the necessity of the reduction of the noise.

5 Claims, 6 Drawing Sheets

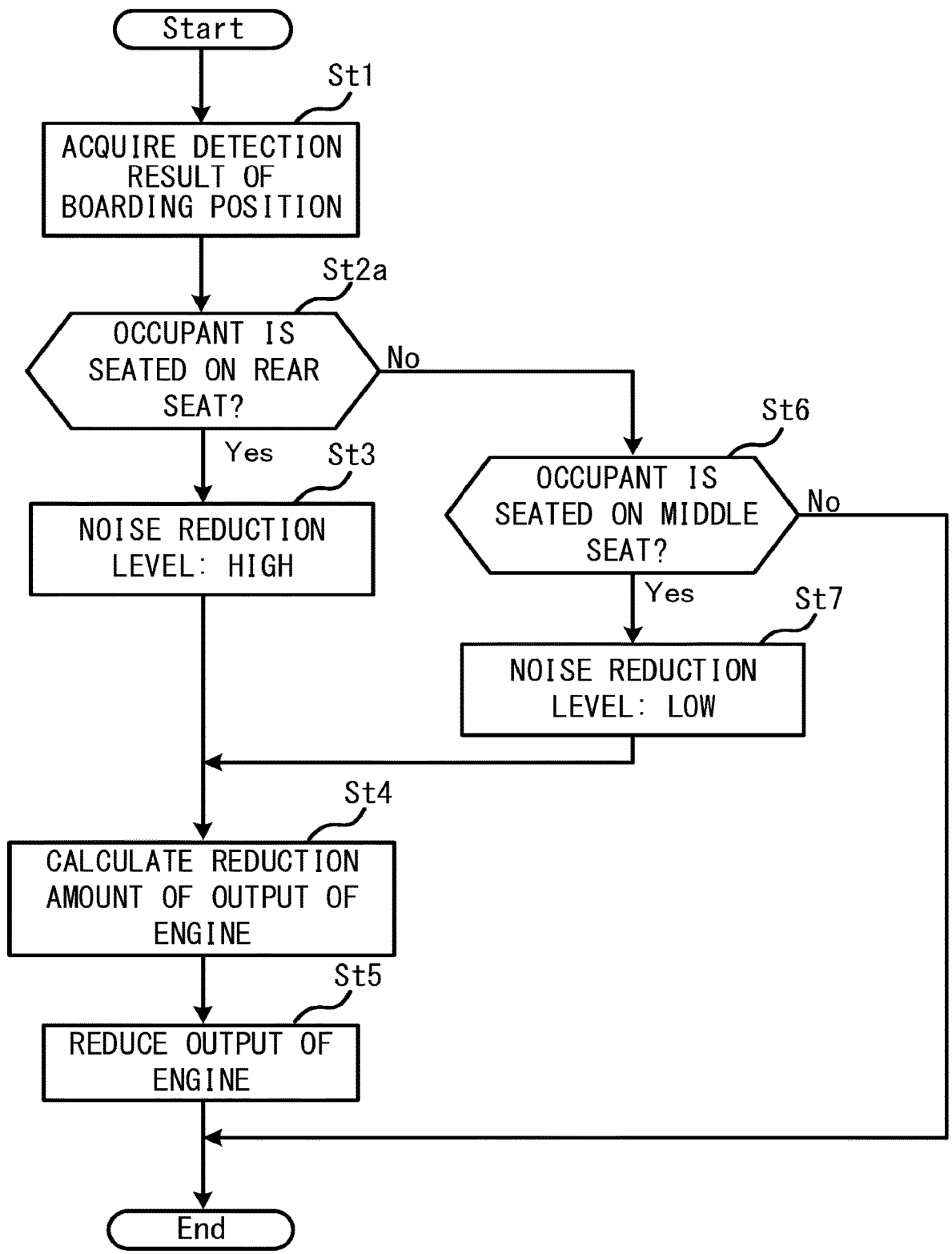

CONTROL DEVICE AND CONTROL METHOD

CROSS-REFERENCE TO RELATED APPLICATION

This application is based upon and claims the benefit of priority of the prior Japanese Patent Application No. 2022-172401, filed on Oct. 27, 2022, the entire contents of which are incorporated herein by reference.

FIELD

The present disclosure relates to a control device and a control method.

BACKGROUND

For example, Japanese Patent Application Laid-Open No. 2018-30510 (Patent document 1) describes that a control device of a vehicle capable of performing automatic driving reduces noise by limiting the rotation speed and torque of the engine so as to narrow the operation region when an occupant is present.

SUMMARY

However, since the occupant may not feel the noise as uncomfortable depending on the boarding position, it is conceivable that the control of reducing the noise of the engine is not appropriate. This problem also occurs in a hybrid vehicle using not only an engine but also a motor generator as a drive source.

Therefore, an object of the present disclosure is to provide a control device and a control method capable of appropriately improving comfort of the occupant of a vehicle.

In one aspect of the present disclosure, there is provided a control device including: an acquisition unit configured to acquire a position at which one or more occupants of a vehicle are seated; and a controller configured to determine necessity of reduction of noise of a drive source of the vehicle based on a distance between the position and the drive source of the vehicle, and reduce the noise by controlling the drive source according to a determination result of the necessity of the reduction of the noise.

In the above control device, the control unit may reduce the noise by reducing an output of the drive source according to the distance between the position and the drive source.

In the above control device, the control unit may reduce the output of the drive source based on a correlation between the output of the drive source and a magnitude of the noise so that the noise of the drive source is reduced according to the distance between the position and the drive source.

In the above control device, the drive source may be an internal combustion engine.

In another aspect of the present disclosure, there is provided a control method implemented by a computer, the control method including: acquiring a position at which one or more occupants of a vehicle are seated; determining necessity of reduction of noise of a driving source of the vehicle based on a distance between the position and the driving source of the vehicle; and reducing the noise by controlling the driving source according to a determination result of the necessity of the reduction of the noise.

BRIEF DESCRIPTION OF THE DRAWINGS

FIG. 6 is a flowchart illustrating another noise reduction process.

DETAILED DESCRIPTION

Configuration of Control Device

Figure 1:
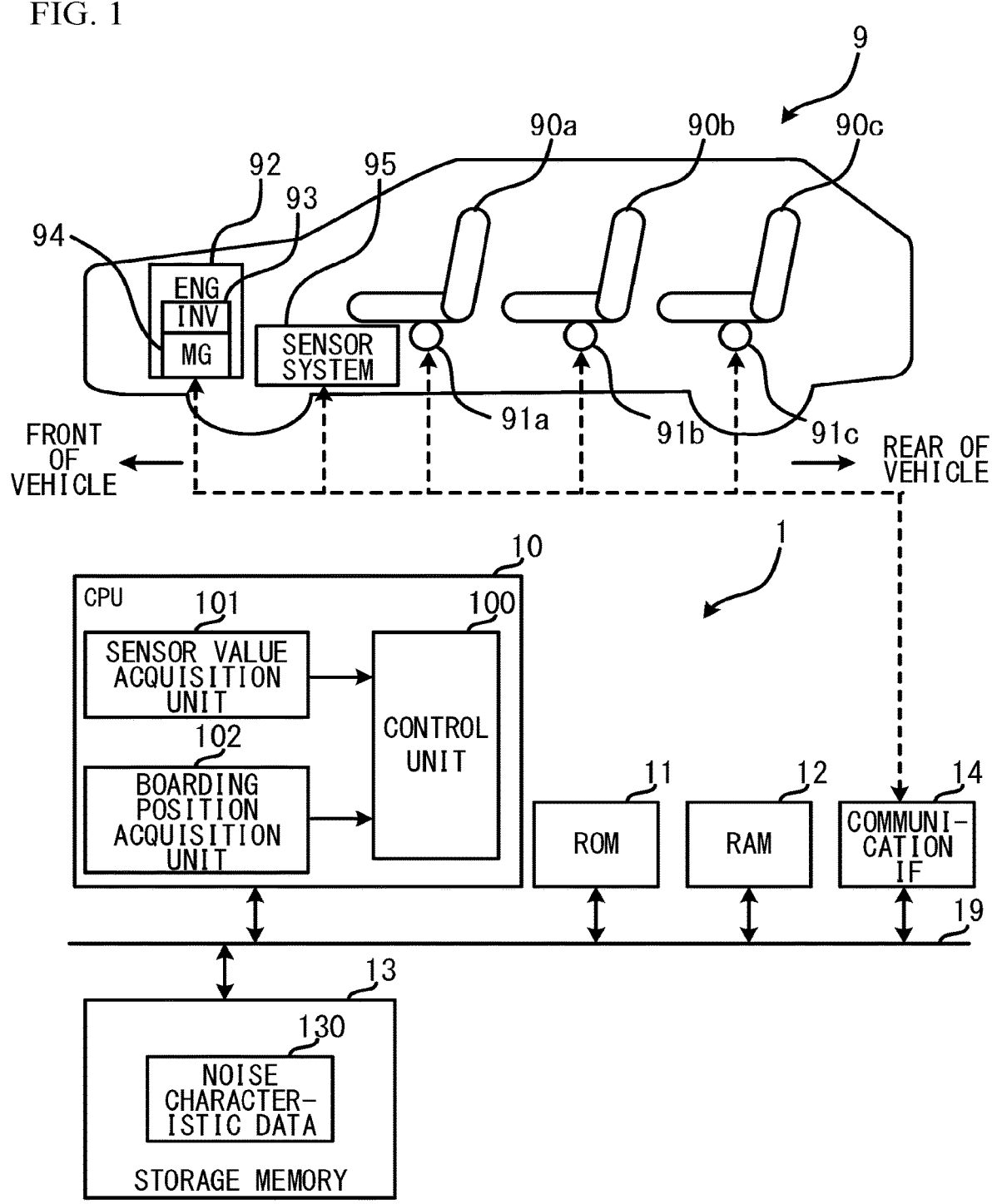
FIG. 1 is a configuration diagram illustrating a vehicle and a control device therefor.

FIG. 1 is a configuration diagram illustrating a vehicle 9 and a control device 1 therefor. The vehicle 9 is, for example, a hybrid vehicle, and includes an engine (ENG) 92, an inverter (INV) 93, and a motor generator (MG) 94 as drive sources. The engine 92 is an example of an internal combustion engine and is, for example, a gasoline engine, but may be a diesel engine. The inverter 93 generates a three phase alternating current for driving the motor generator 94. The vehicle 9 of the present example is a front engine vehicle, and the engine 92, the inverter 93, and the motor generator 94 are located in the front of the vehicle 9. In this example, reduction of the noise of the engine 92 will be described as an example.

The vehicle 9 has a three-row seat arrangement, as an example, and includes a front seat 90a, a middle seat 90b, and a rear seat 90c. The front seat 90a is located at the most front side of the vehicle 9, the rear seat 90c is located at the most rear side of the vehicle 9, and the middle seat 90b is located between the front seat 90a and the rear seat 90c in the front-rear direction of the vehicle 9. The vehicle 9 has an automatic driving function and can travel even when the driver is not seated on the front seat 90a.

The front seat 90a, the middle seat 90b, and the rear seat 90c are provided with weight sensors 91a to 91c, respectively. The weight sensors 91a to 91c detect the presence or absence of seated occupants by detecting a load applied to the front seat 90a, the middle seat 90b, and the rear seat 90c, respectively. In other words, the weight sensors 91a to 91c detect the position at which the occupant is seated. The detection means of the boarding position is not limited to the weight sensors 91a to 91c, and other detection means such as human sensors may be used.

The vehicle 9 also includes a sensor system 95. The sensor system 95 includes various sensors that determine operations of the engine 92 and the motor generator 94, such as an accelerator opening degree sensor that detects the opening degree of the accelerator and a vehicle speed sensor that detects a vehicle speed. The location of the sensor system 95 in FIG. 1 is independent of the actual location in the vehicle 9.

The control device 1 is, for example, a computer such as an electronic control unit (ECU), and is provided at a predetermined position of the vehicle 9. The control device 1 includes a central processing unit (CPU) 10, a read only memory (ROM) 11, a random access memory (RAM) 12, a storage memory 13, and a communication interface unit (communication IF) 14. The CPU 10 is electrically connected to the ROM 11, the RAM 12, the storage memory 13, and the communication IF 14 via a bus 19 so that signals can be input and output to and from each other.

The ROM 11 stores a program for driving the CPU 10. The RAM 12 serves as a working memory for the CPU 10.

The communication IF 14 is a communication circuit and transmits, for example, various instructions to the engine 92, the inverter 93, and the motor generator 94.

When reading the program from the ROM 11, the CPU 10 generates a control unit 100, a sensor value acquisition unit 101, and a boarding position acquisition unit 102 as functions. Noise characteristic data 130 is stored in the storage memory 13. The storage memory 13 is a nonvolatile memory such as a flash memory, for example.

The sensor value acquisition unit 101 acquires various sensor values such as the accelerator opening degree and the vehicle speed from the sensor system 95 via the communication IF 14. The sensor value acquisition unit 101 outputs various sensor values to the control unit 100.

The boarding position acquisition unit 102 is an example of an acquisition unit that acquires each of the positions on which the occupants are seated. The boarding position acquisition unit 102 acquires a detection result of the presence or absence of an occupant in each of the front seat 90a, the middle seat 90b, and the rear seat 90c from the weight sensors 91a to 91c. Here, the front seat 90a, the middle seat 90b, and the rear seat 90c are examples of positions at which the occupants are seated. The boarding position acquisition unit 102 outputs the detection result of the boarding position to the control unit 100.

The control unit 100 controls the engine 92, the inverter 93, and the motor generator 94. The control unit 100 calculates a command torque from each sensor value and controls, for example, a fuel injection amount of the engine 92 and a duty ratio of a pulse width modulation (PWM) signal of the inverter 93 according to the command torque. In the case of automatic driving, the control unit 100 controls the engine 92, the inverter 93, and the motor generator 94 based on an image of an in-vehicle camera (not illustrated), a detection result of a peripheral vehicle, location information of the vehicle 9, and the like. In this manner, the outputs of the engine 92 and the motor generator 94 are determined.

Further, the control unit 100 determines whether the noise of the engine 92 is required to be reduced based on the distance between the boarding position of the occupant and the engine 92, and reduces the noise by controlling the engine 92 according to the determination result. For example, based on the detection result of the boarding position, when the front seat 90a and the middle seat 90b, which are close to the engine 92, are the boarding positions, the control unit 100 reduces the noise, and when the rear seat 90c, which is farther from the engine 92, is the boarding position, the control unit 100 does not reduce the noise.

Therefore, when an occupant is seated only in the rear seat 90c where noise is lower than that in the front seat 90a and the middle seat 90b, the control unit 100 does not reduce noise and can omit unnecessary control. Thus, the control unit 100 can appropriately improve the comfort of the occupant.

The control unit 100 reduces the noise of the engine 92 by reducing the output of the engine 92 based on the distance between the boarding position of the occupant and the engine 92. For example, when the middle seat 90b is the boarding position, the control unit 100 reduces the output of the engine 92 so that noise is reduced according to the distance between the middle seat 90b and the engine 92. Therefore, the control unit 100 can appropriately improve the comfort of the occupant according to the boarding position of the occupant.

When a plurality of occupants are on board, the control unit 100 reduces the output of the engine 92 based on the shortest distance among the distances between the boarding positions of the occupants and the engine 92. For example, when the front seat 90a and the middle seat 90b are the boarding positions, the distance between the front seat 90a and the engine 92 is shorter than the distance between the middle seat 90b and the engine 92. Therefore, the control unit 100 reduces the output of the engine 92 so that the noise is reduced according to the distance between the front seat 90a and the engine 92. Therefore, the control unit 100 can control the degree of noise reduction based on the boarding position closest to the engine 92.

The control unit 100 reduces the output of the engine 92 based on the correlation between the output of the engine 92 and the magnitude of the noise so that the noise of the engine 92 is reduced according to the distance between the boarding position of the occupant and the engine 92. The noise characteristic data 130 indicates a correlation between the output of the engine 92 and the magnitude of noise.

Figure 2:
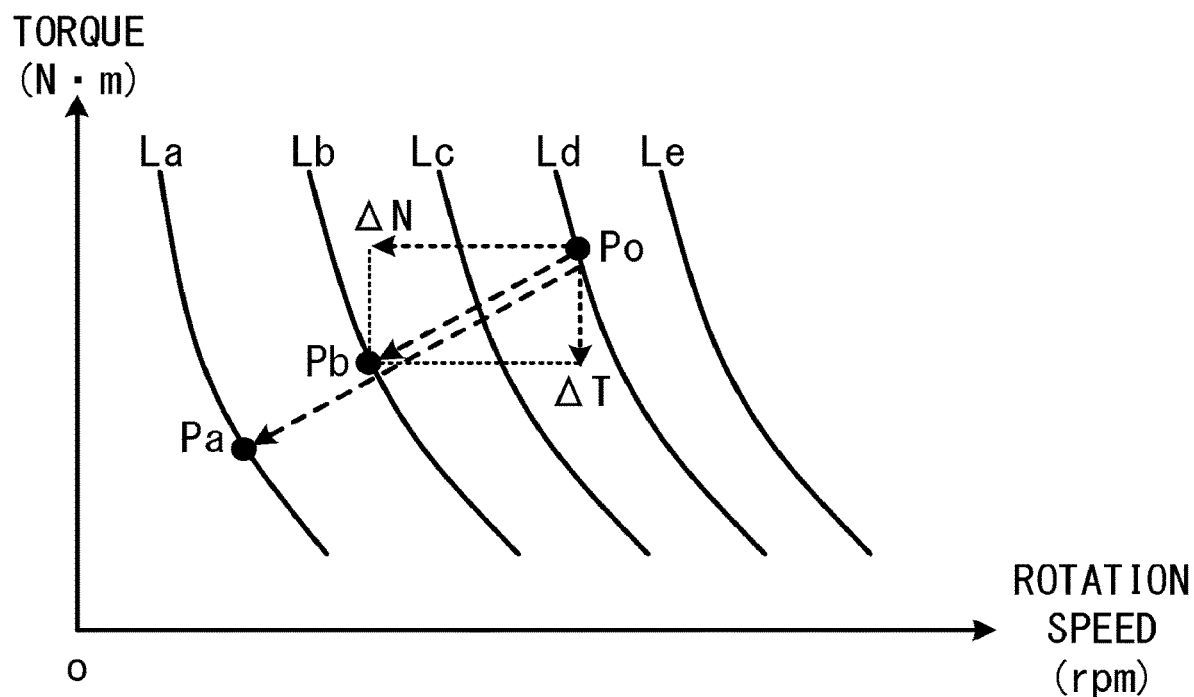
FIG. 2 illustrates an example of noise characteristic data.

FIG. 2 illustrates an example of the noise characteristic data 130. In FIG. 2, the horizontal axis represents the rotation speed (rotation number) (rpm) of the engine 92, and the vertical axis represents the torque (N/m) of the engine 92. Each of the noise-level contours La to Le indicates rotation speeds and torques at which the noise level (for example, decibel (dB)) is the same. The noise level increases in the order of the noise-level contours La to Le.

The control unit 100 determines the base operating point Po based on the detection result of the sensor system 95 or the like. Here, the base operating point Po is located, for example, on the noise-level contour Ld. When reducing noise, the control unit 100 reduces the output of the engine 92 to the output of one of, for example, the operating points Pa and Pb on the respective noise-level contours La and Lb whose noise level are lower than that of the noise-level contour Ld of the base operating point Po. For example, when reducing the output of the engine 92 to the operating point Pb, the control unit 100 reduces the torque and the rotation speed by the torque difference $\Delta T$ and the rotation speed difference $\Delta N$ from those of the base operating point Po, respectively.

The control unit 100 determines the target operating point Pa or Pb based on the shortest distance between the boarding position and the engine 92. Specifically, the control unit 100 selects the operating points Pa or Pb of the noise level suitable for the boarding position of the occupant closest to the engine 92. For example, when the boarding position closest to the engine 92 is the front seat 90a, the operating point Pa is selected, and when the boarding position closest to the engine 92 is the middle seat 90b, the operating point Pb is selected. Therefore, as the shortest distance between the boarding position and the engine 92 becomes shorter, the output of the engine 92 is reduced and the magnitude of the noise is appropriately reduced.

The noise characteristic data 130 is generated in advance based on a simulation or an experiment related to the noise of the engine 92. The control unit 100 does not need to reduce both the torque and the rotation speed of the engine 92, and may reduce only one of the torque and the rotation speed.

Noise Reduction Process

Figure 3:
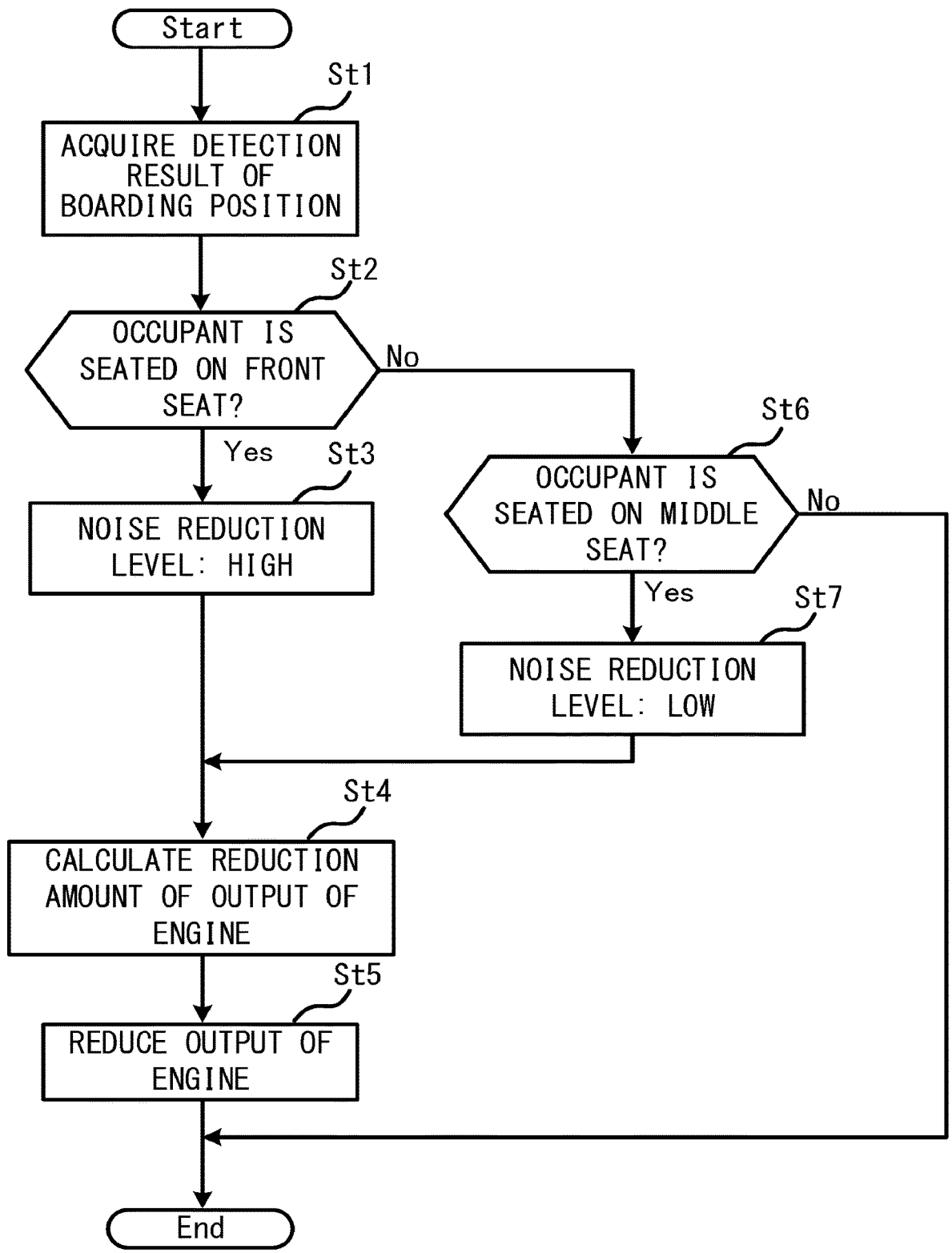
FIG. 3 is a flowchart illustrating a noise reduction process.

FIG. 3 is a flowchart illustrating an example of the noise reduction process. This process is an example of a control method, and is executed periodically, for example. First, a boarding position acquisition unit 102 acquires the detection result of the boarding position from each of the weight sensors 91a to 91c (step SU). Then, the control unit 100 determines whether an occupant is seated on the front seat 90a (step St2).

When an occupant is seated on the front seat 90a (Yes in step St2), the control unit 100 determines the noise reduction level to be "high" (step St3). In this case, the control unit 100 selects the operating point Pa on the noise-level contour La in the example described above.

When no occupant is seated on the front seat 90a (No in step St2), the control unit 100 determines whether an occupant is seated on the middle seat 90b (step St6). When an occupant is seated on the middle seat 90b (Yes in step St6), the control unit 100 determines the noise reduction level to be "low" (step St7). In this case, the control unit 100 selects the operating point Pb on the noise-level contour Lb in the example described above.

Then, the control unit 100 calculates a reduction amount of the output of the engine 92 corresponding to the noise reduction level (step St4). Based on the noise characteristic data 130, the control unit 100 calculates the reduction amounts (ΔT and ΔN in FIG. 2) of the output of the engine 92 corresponding to the selected operating point Pa or Pb.

Then, the control unit 100 reduces the output of the engine 92 by the reduction amount (step St5). Specifically, the control unit 100 reduces the output of the engine 92 so that the control point transitions from the base operating point Po to the selected operating point Pa or Pb. In this manner, the control unit 100 reduces the output of the engine 92 based on the noise characteristic data 130 so that the noise is reduced according to the shortest distance between the engine 92 and the boarding position. This improves the comfort of the occupants in the front seat 90a and the middle seat 90b.

When no occupant is seated on the middle seat 90b (No in step St6), the control unit 100 ends the process without reducing the output of the engine 92. That is, when the rear seat 90c is the boarding position, the influence of the noise on the occupant in the rear seat 90c is small, and thus the control unit 100 does not reduce the noise. In this manner, the control unit 100 determines whether noise reduction is necessary based on the distance between the boarding position and the engine 92. Therefore, when the effectiveness of the noise reduction is low, unnecessary control of the engine 92 can be omitted.

Example of Noise Reduction

Figure 4:
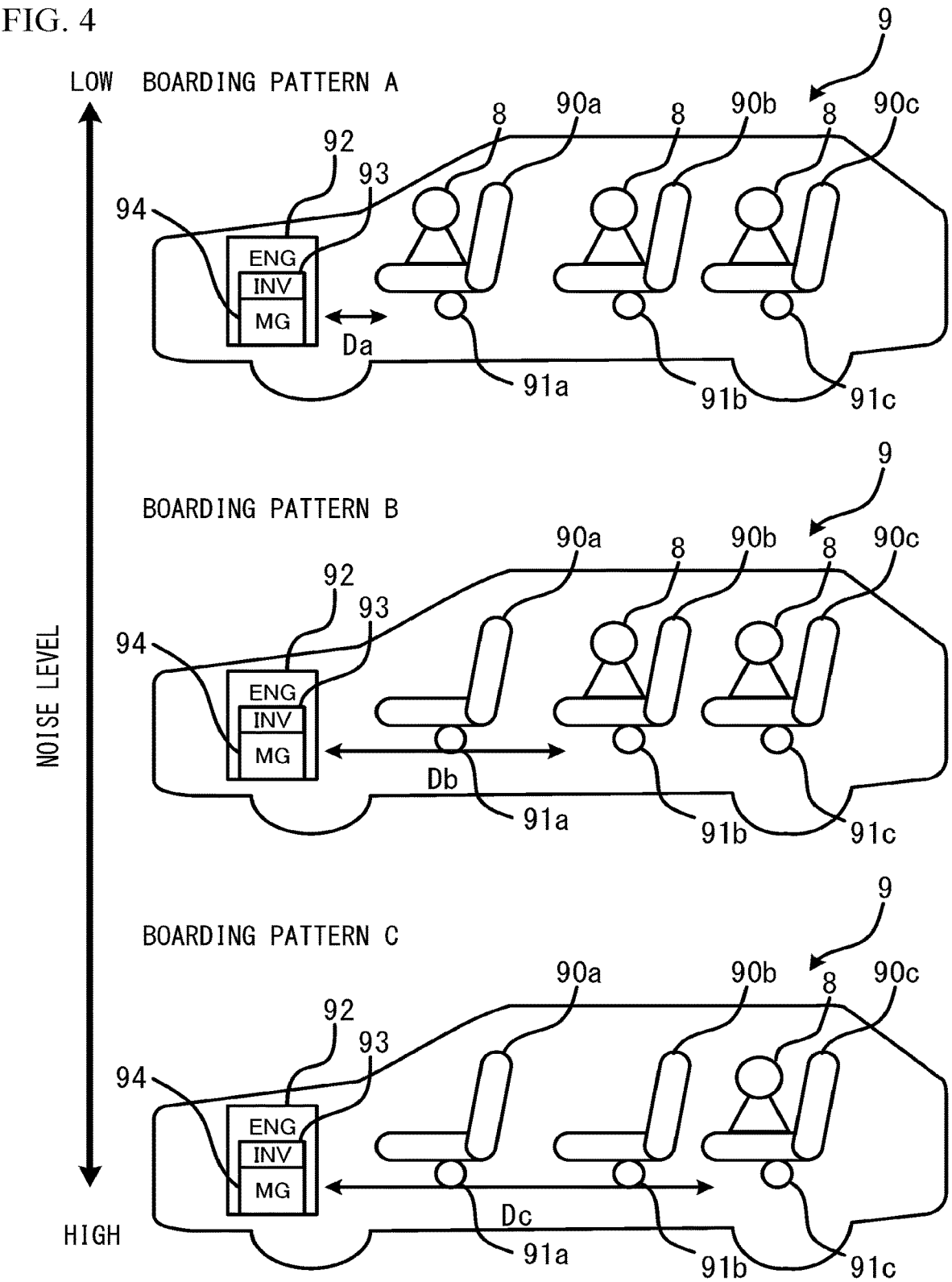
FIG. 4 is a diagram illustrating an example of the magnitude of the noise level according to the boarding pattern of occupants.

FIG. 4 is a diagram illustrating an example of the magnitude of the noise level according to boarding patterns A to C of occupants. In FIG. 4, the same components as those in FIG. 1 are denoted by the same reference numerals, and the description thereof is omitted.

In the boarding pattern A, occupants 8 are seated on the front seat 90a, the middle seat 90b, and the rear seat 90c, respectively. In the boarding pattern B, no occupant 8 is seated on the front seat 90a, and the occupants 8 are seated on the middle seat 90b and the rear seat 90c. In the boarding pattern C, no occupant 8 is seated on the front seat 90a and the middle seat 90b, and the occupant 8 is seated on the rear seat 90c.

The boarding position acquisition unit 102 identifies the boarding position of the occupant 8 from the detection results acquired from the weight sensors 91a to 91c. The control unit 100 sets the noise reduction level based on the boarding position.

In the case of the boarding pattern A, the boarding position closest to the engine 92 is the front seat 90a. Here, the distance between the front seat 90a and the engine 92 is defined as Da. In the case of the boarding pattern B, the boarding position closest to the engine 92 is the middle seat 90b. Here, the distance between the middle seat 90b and the engine 92 is defined as Db. In the case of the boarding pattern C, the boarding position closest to the engine 92 is the rear seat 90c. Here, the distance between the rear seat 90c and the engine 92 is defined as Dc. Among the distances Da to Dc of the boarding patterns A to C, Da<Db<Dc is established. In the cases of the boarding patterns B and C in which there is no occupant 8 in the front seat 90a, the vehicle 9 is driven by automatic driving.

The control unit 100 determines whether noise reduction is necessary based on the distances Da to Dc. In the case of the boarding pattern C, since the distance Dc is longer than other distances Da and Db, the control unit 100 determines that noise reduction is unnecessary and does not execute noise reduction. On the other hand, in the case of the boarding patterns A and B, noise reduction is executed.

When executing noise reduction, the control unit 100 sets the noise reduction level so that the noise level is lower as the distances Da and Db are longer. In the case of the boarding pattern A, the noise reduction level is set to "high", and in the case of the boarding pattern B, the noise reduction level is set to "low".

Therefore, the noise level of the engine 92 is the lowest in the boarding pattern A, and is the second lowest in the boarding pattern B. Further, the noise level of the boarding pattern C is the highest. As described above, the control device 1 can appropriately execute noise reduction according to the distance between the engine 92 and the boarding position.

Although noise reduction of the engine 92 has been described as an example in the present embodiment, the above-described control method can also be used for noise reduction of the motor generator 94, for example. In this case, the control unit 100 executes noise reduction by controlling the carrier frequency of the inverter 93. As the carrier frequency increases, the noise decreases but the switching loss increases. The control unit 100 can appropriately reduce noise by controlling the carrier frequency according to the distances Da to Dc between the motor generator 94 and the respective boarding positions in the same manner as described above. Further, the control unit 100 is not limited to this, and may control the rotation speed of the motor generator 94 or the duty ratio of the PWM signal of the inverter 93 so that noise is reduced.

Other Embodiments

In the above example, the vehicle 9 is a front-engine vehicle. However, this does not intend to suggest any limitation, and the above control method can be similarly used in a rear-engine vehicle.

Figure 5:
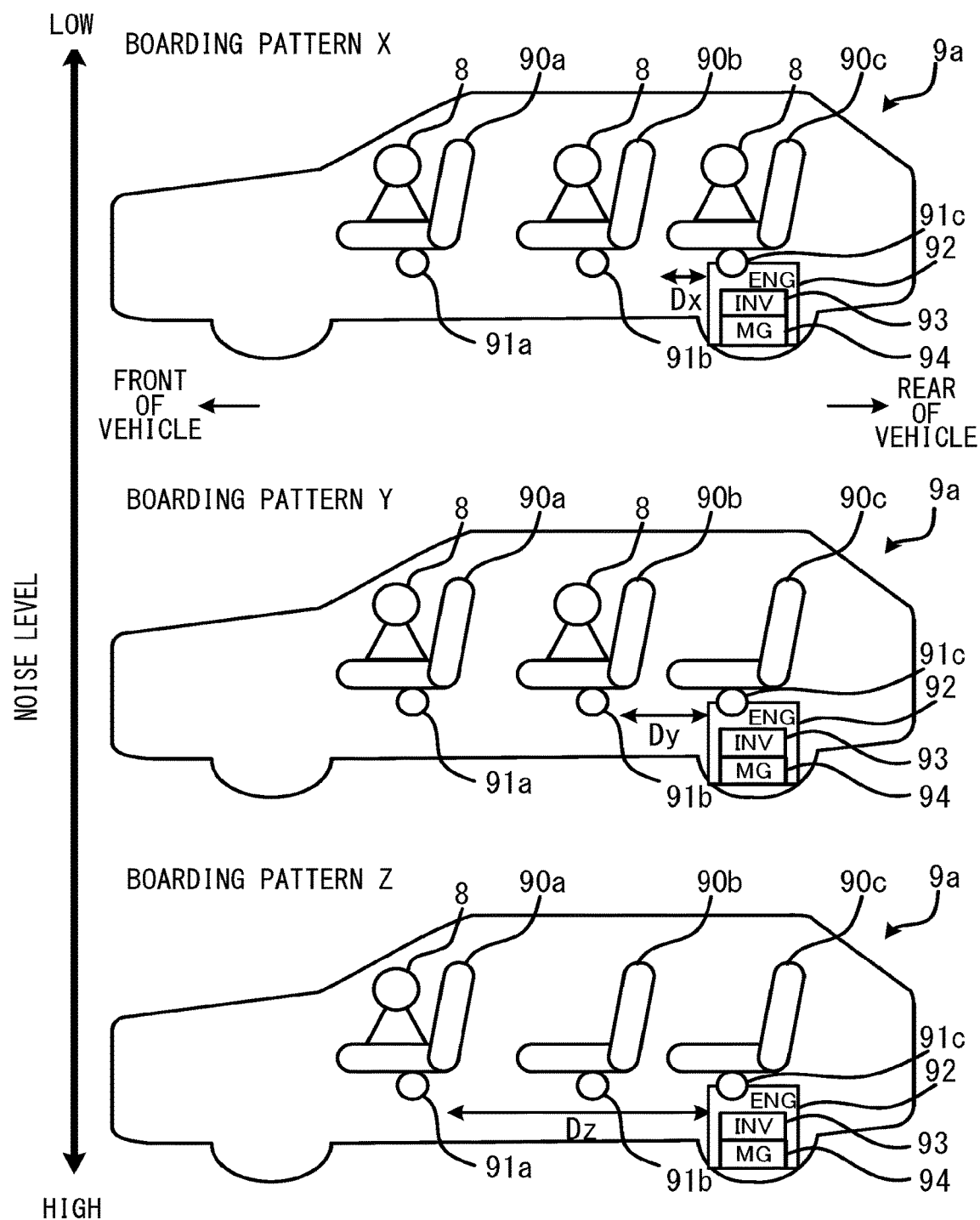
FIG. 5 is a diagram illustrating an example of the magnitude of the noise level according to a boarding pattern of occupants in another vehicle.

FIG. 5 is a diagram illustrating an example of the magnitude of the noise level according to boarding patterns X to Z of occupants in another vehicle 9a. In FIG. 5, the same components as those in FIG. 4 are denoted by the same reference numerals, and description thereof is omitted. The vehicle 9a is a rear-engine vehicle, and the engine 92, the invertor 93, and the motor generator 94 are located in the rear of the vehicle 9a.

In the boarding pattern X, the occupants 8 are seated on the front seat 90a, the middle seat 90b, and the rear seat 90c, respectively. In the boarding pattern Y, no occupant 8 is seated on the rear seat 90c, and the occupants 8 are seated on the front seat 90a and the middle seat 90b, respectively.

In the boarding pattern Z, no occupant 8 is seated on the middle seat 90b and the rear seat 90c, and the occupant 8 is seated on the front seat 90a.

In the case of the boarding pattern X, the boarding position closest to the engine 92 is the rear seat 90c. Here, the distance between the rear seat 90c and the engine 92 is defined as Dx. In the case of the boarding pattern Y, the boarding position closest to the engine 92 is the middle seat 90b. Here, the distance between the middle seat 90b and the engine 92 is defined as Dy. In the case of the boarding pattern Z, the boarding position closest to the engine 92 is the front seat 90a. Here, the distance between the front seat 90a and the engine 92 is defined as Dz. Among the distances Dx to Dz of the boarding patterns X to Z, Dz>Dy>Dx is established.

The control unit 100 determines whether noise reduction is necessary based on the distances Dx to Dz. In the case of the boarding pattern Z, since the distance Dz is longer than other distances Dx and Dy, the control unit 100 determines that noise reduction is unnecessary and does not execute noise reduction. On the other hand, in the case of the boarding patterns X and Y, noise reduction is executed.

When executing noise reduction, the control unit 100 sets the noise reduction level so that the noise level is lower as the distances Dx and Dy are longer. In the case of the boarding pattern X, the noise reduction level is set to "high", and in the case of the boarding pattern Y, the noise reduction level is set to "low".

Therefore, the noise level of the engine 92 is the lowest in the boarding pattern X, and is the second lowest in the boarding pattern Y. Further, the noise level of the boarding pattern Z is the highest. As described above, the control device 1 can appropriately execute the noise reduction according to the distance between the engine 92 and the boarding position also in the case of the rear-engine vehicle 9a.

FIG. 6 is a flowchart illustrating another example of the noise reduction process. This process is executed in the case of the rear-engine vehicle 9a described above. In FIG. 6, the same processes as those in FIG. 3 are denoted by the same reference numerals, and description thereof will be omitted.

After the process of step St1, when an occupant is seated on the rear seat 90c (Yes in step St2a), the control unit 100 determines the noise reduction level to be "high" (step St3). When no occupant is seated on the rear seat 90c (No in step St2a), the control unit 100 determines whether an occupant is seated on the middle seat 90b (step St6). When an occupant is seated on the middle seat 90b (Yes in step St6), the control unit 100 determines the noise reduction level to "low" (step St7). When no occupant is seated on the middle seat 90b (No in step St6), the control unit 100 ends the process without reducing the output of the engine 92. The noise reduction process is executed in this manner.

In each of the examples described above, the number of rows of seats in the vehicles 9 and 9a is three, but is not limited thereto. For example, even when the number of rows of seats is large as in a bus, the above-described control method can be similarly used.

Although some embodiments of the present invention have been described in detail, the present invention is not limited to the specific embodiments but may be varied or changed within the scope of the present invention as claimed.

What is claimed is:

1. A control device comprising:
    an acquisition unit configured to acquire a position at which one or more occupants of a vehicle are seated; and
    a controller configured to determine necessity of reduction of noise of a drive source of the vehicle based on a distance between the position and the drive source of the vehicle, and reduce the noise by controlling the drive source according to a determination result of the necessity of the reduction of the noise.

2. The control device according to claim 1, wherein the control unit reduces the noise by reducing an output of the drive source according to the distance between the position and the drive source.

3. The control device according to claim 2, wherein the control unit reduces the output of the drive source based on a correlation between the output of the drive source and a magnitude of the noise so that the noise of the drive source is reduced according to the distance between the position and the drive source.

4. The control device according to claim 1, wherein the drive source is an internal combustion engine.

5. A control method implemented by a computer, the control method comprising:
    acquiring a position at which one or more occupants of a vehicle are seated;
    determining necessity of reduction of noise of a driving source of the vehicle based on a distance between the position and the driving source of the vehicle; and
    reducing the noise by controlling the driving source according to a determination result of the necessity of the reduction of the noise.

* * * * *